United States Patent
McAuley et al.

(10) Patent No.: US 8,793,438 B2
(45) Date of Patent: Jul. 29, 2014

(54) ATOMIC COMPARE AND WRITE MEMORY

(75) Inventors: Derek McAuley, Cambridge (GB); Gavin Stark, Cambridge (GB)

(73) Assignee: Netronome Systems, Incorporated, Santa Clara, CA (US)

( * ) Notice: Subject to any disclaimer, the term of this patent is extended or adjusted under 35 U.S.C. 154(b) by 1230 days.

(21) Appl. No.: 12/579,649

(22) Filed: Oct. 15, 2009

(65) Prior Publication Data

US 2011/0093663 A1    Apr. 21, 2011

(51) Int. Cl.
G06F 12/00    (2006.01)

(52) U.S. Cl.
USPC ............................. 711/141; 711/144

(58) Field of Classification Search
USPC .......................... 711/154, 141, 144
See application file for complete search history.

(56) References Cited

U.S. PATENT DOCUMENTS

| 4,584,640 | A | * | 4/1986 | MacGregor et al. ............... 1/1 |
| 5,428,761 | A | | 6/1995 | Herlihy et al. |
| 7,434,010 | B2 | | 10/2008 | Duffy et al. |
| 2005/0246591 | A1 | * | 11/2005 | Johnson et al. ............... 714/47 |
| 2007/0260826 | A1 | * | 11/2007 | Greiner et al. ............... 711/154 |
| 2010/0332770 | A1 | * | 12/2010 | Dice et al. ............... 711/148 |

* cited by examiner

Primary Examiner — Kalpit Parikh
(74) Attorney, Agent, or Firm — Imperium Patent Works

(57) ABSTRACT

A microcontroller system may include a microcontroller having a processor and a first memory, a memory bus and a second memory in communication with the microcontroller via the memory bus. The first memory may include instructions for accessing a first data set from a contiguous memory block in the second memory. The first data set may include a first word having a first value and a plurality of first other words. The first memory may include instructions for receiving a write instruction including a second data set to be written to the contiguous memory block. The first memory may include instructions for determining whether the first value equals the second value. If so, the first memory may include instructions for writing the second data set to the contiguous memory block and updating the first value.

17 Claims, 4 Drawing Sheets

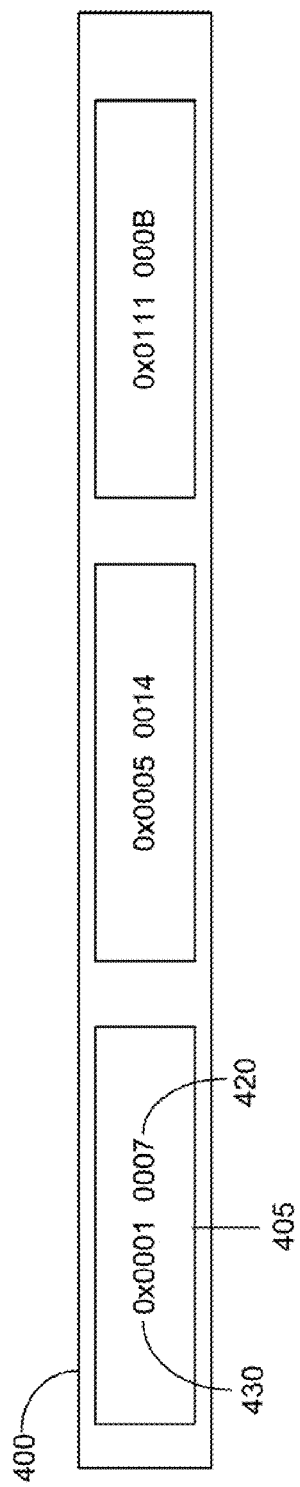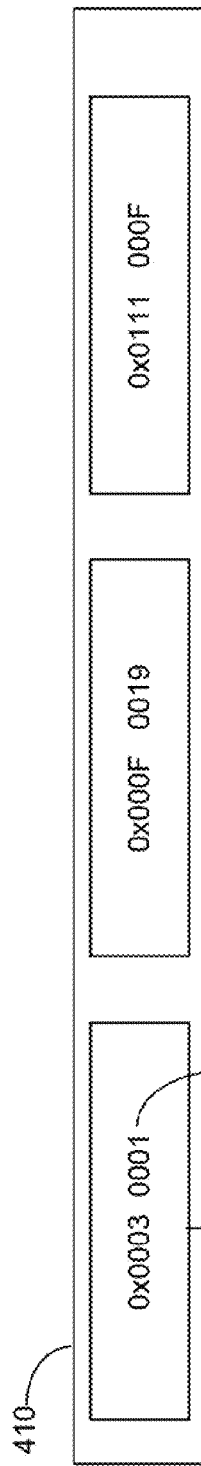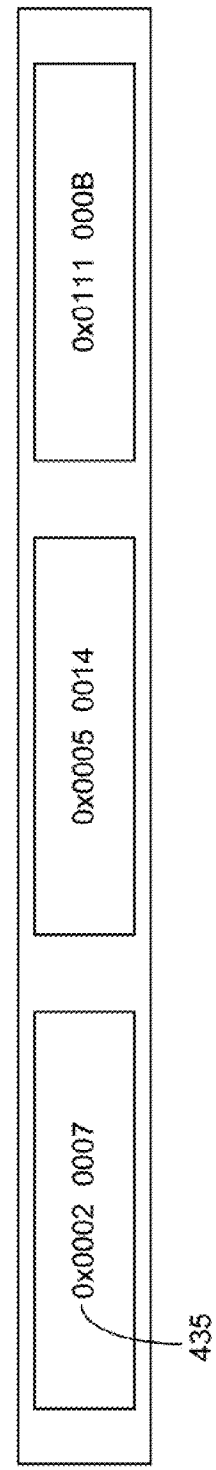

ATOMIC COMPARE AND WRITE MEMORY

BACKGROUND

Concurrency control in multiprocessing and multithreading systems is an important technique for minimizing the time for which locks are held and the time threads spend idle waiting for other threads to complete tasks. Compare and swap (CASN) operations, such as compare and swap word (CAS1) instructions, are often used to implement locks to protect data structures in memory against concurrent access. CAS1 is a common instruction that atomically compares the content of a memory location to a first value. If the content and the first value are the same, the CAS1 instruction replaces the content of the memory location with a second value.

However, implementing a CASN operation using such a technique would be difficult because comparing the content of all of the memory locations to values before updating the content of the memory locations would be computationally expensive and time-consuming.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a microcontroller system may include a microcontroller. The microcontroller may include a processor and a first memory. The microcontroller system may include a memory bus and a second memory in communication with the microcontroller via the memory bus. The first memory may include one or more instructions for accessing a first data set from a contiguous memory block in the second memory. The first data set may include a first word having a first value and a plurality of first other words. The first memory may include one or more instructions for receiving a write instruction including a second data set to be written to the contiguous memory block. The second data set may include a second word having a second value and a plurality of second other words. The first memory may include one or more instructions for determining whether at least a portion of the first value equals at least a portion of the second value. In response to the portion of the first value equaling the portion of the second value, the first memory may include one or more instructions for writing the second data set to the contiguous memory block and updating the first value.

In an embodiment, a method of controlling access to memory may include accessing, by a microcontroller, a first data set from a contiguous memory block in a first memory. The first data set may include a first word having a first value, and a plurality of first other words. The microcontroller may include a processor and a second memory in communication with the first memory via a memory bus. The method may include receiving, by the microcontroller, a write instruction comprising a second data set to be written to the contiguous memory block. The second data set may include a second word having a second value and a plurality of second other words. The method may include determining whether a portion of the first value equals at least a portion of the second value, and, in response to the portion of the first value equaling the portion of the second value, writing the second data set to the contiguous memory block and updating the first value.

BRIEF DESCRIPTION OF THE DRAWINGS

Aspects, features, benefits and advantages of the present invention will be apparent with regard to the following description and accompanying drawings, of which:

FIGS. 4A-C illustrate states of an exemplary memory block during a second exemplary write access according to an embodiment.

DETAILED DESCRIPTION

For purposes of the discussion below, a "microcontroller" refers to a single chip that may include a processor, non-volatile memory, such as ROM, volatile memory, such as RAM, and an I/O control unit.

Sharing memory among multiple threads and/or processing units provides productivity, performance and efficiency advantages over using a non-shared memory structure. For example, shared memory can facilitate communication between resources and/or threads and can also reduce the amount of memory space that is required in a system.

One problem that can result from using shared memory occurs as a result of concurrent accesses to memory by multiple processing units. For example, in the case of multiword data, a first processing unit may modify a shared first memory location and may be in the process of modifying subsequent memory locations when a second processing unit attempts to modify the first memory location. As such, the data stored in the first memory location can be corrupted if concurrent memory accesses are not properly handled.

Figure 1:
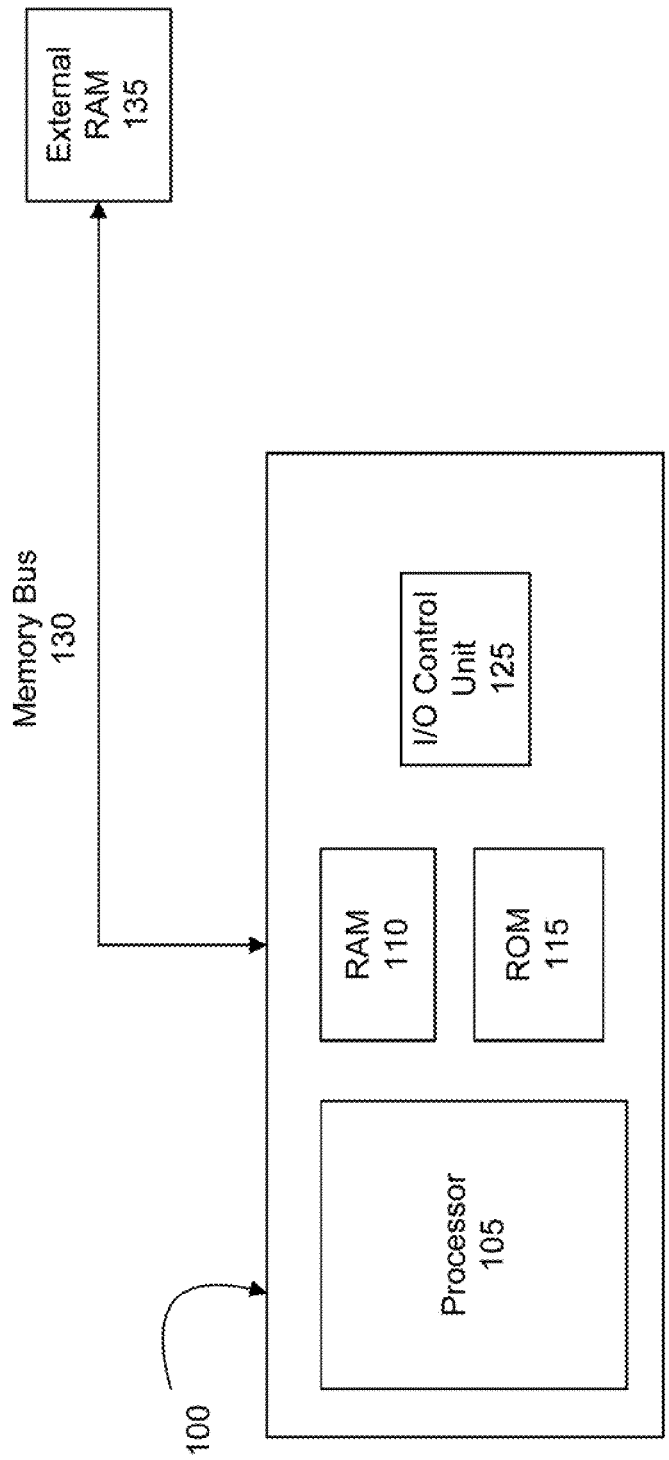
FIG. 1 illustrates an exemplary microcontroller system according to an embodiment.

FIG. 1 illustrates an exemplary microcontroller system according to an embodiment. As illustrated by FIG. 1, a microcontroller 100 may include a processor 105, RAM 110, ROM 115 and an input/output control unit 125. In an embodiment, a microcontroller 100 may perform concurrency control of memory using atomic compare and write memory (ACWM) instructions. In an embodiment, a microcontroller 100 may access a contiguous memory block from external RAM 135. For example, the microcontroller 100 may read data stored in an external RAM 135 via a memory bus 130, as illustrated by FIG. 1. In an embodiment, the data may be stored as one or more cache lines. For example, each cache line may contain 128 bits of data, 256 bits of data and/or the like. In an embodiment, a microprocessor may access a memory block that includes at least a portion of a cache line. For example, a memory block may be a single cache line, a fraction of a cache line, multiple cache lines and/or the like.

In an embodiment, the read data may be temporarily stored in the memory of the microcontroller 100. For example, the read data may be stored in the microcontroller's RAM 110. A first word of the read data may be used as a lock to control access to the remaining words in the data. For example, writing data to the memory block may be performed conditionally based on the value stored in the first word.

Figure 2:
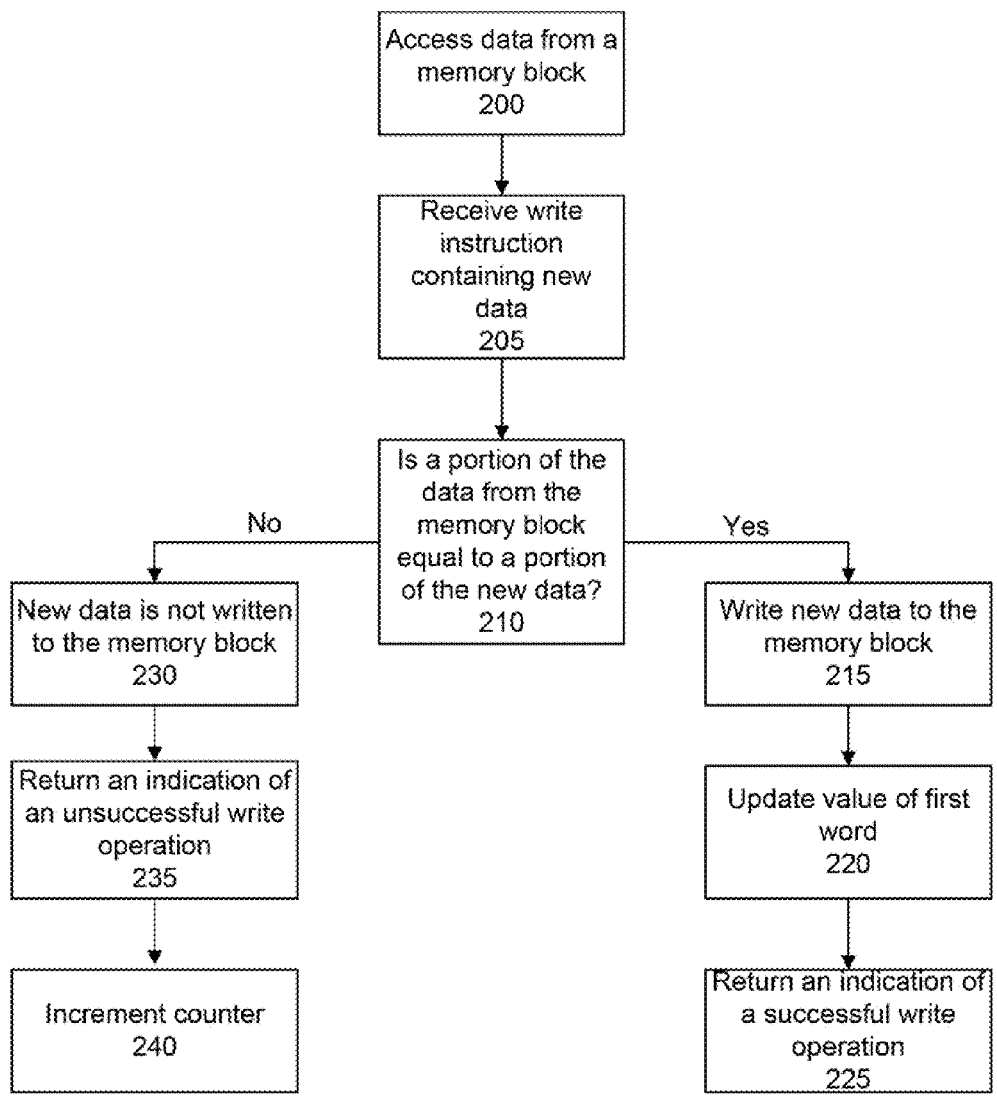
FIG. 2 illustrates an exemplary method of performing concurrency control according to an embodiment.
Figure 3A:
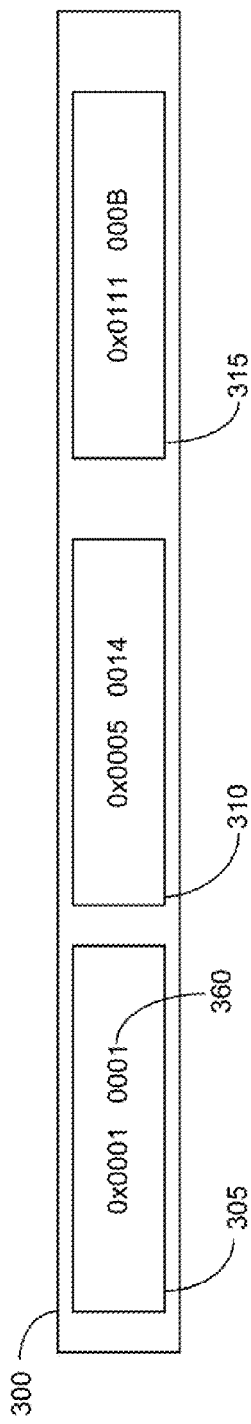
FIGS. 3A-C illustrate states of an exemplary memory block during a first exemplary write access according to an embodiment.
Figure 3B:
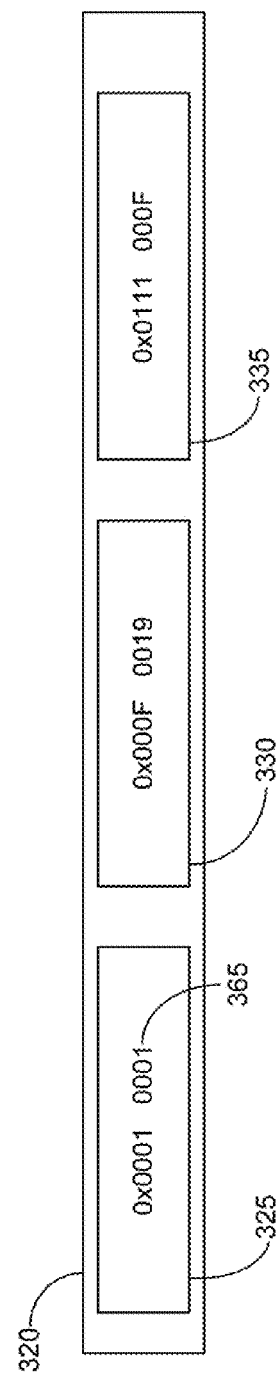

FIG. 2 illustrates an exemplary method of controlling concurrent accesses using ACWM instructions according to an embodiment. As illustrated by FIG. 2, a memory block may be accessed 200. In an embodiment, the first word of the data in the accessed memory block may have a certain value. For example, FIG. 3A illustrates an exemplary memory block 300 that may be accessed. As shown in FIG. 3B, the memory block 300 may include three 32-bit words 305, 310, 315.

Subsequently, a write instruction may be received 205. The write instruction may include new data to be written to the memory block location 300. For example, FIG. 3B illustrates exemplary data 320 to be written to the memory block location 300. As illustrated in FIG. 3B, the data 320 may include three 32-bit words 325, 330, 335.

In an embodiment, at least a portion of the first word of the accessed data from the memory block may be compared 210 against at least a portion of the first word of the data in the write instruction. For example, the lower 16 bits of the first word of both the data from the accessed memory block and the received data may be compared. Referring to FIGS. 3A and 3B, the lower 16 bits 360 of the first word 305 of the data from the memory block 300 may be compared with the lower 16 bits 365 of the first word 325 of the new data 320. Additional and/or alternate sized portions of the first word of the data from the accessed memory block and the received data may be compared and/or used within the scope of this disclosure.

Figure 3C:
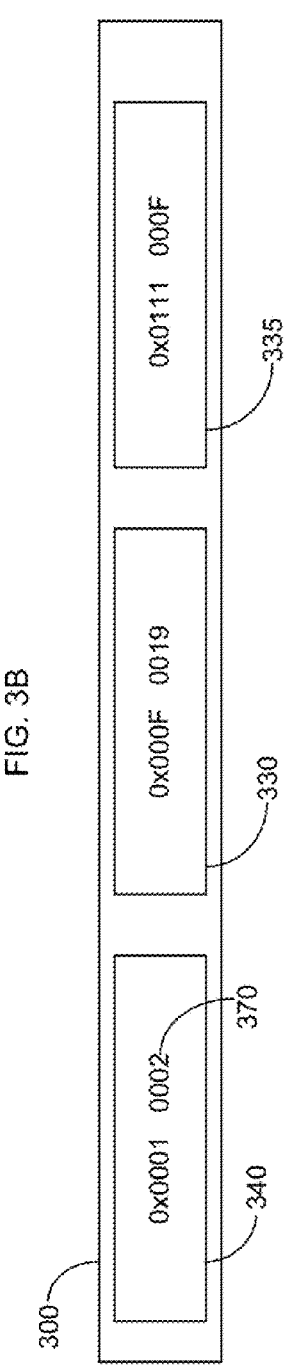

In response to the values being equal, the new data may be written 215 to the memory block location 300. For example, referring to FIGS. 3A and 3B, the value of the lower 16 bits 360 of the first word 305 of the data from the memory block 300 is equal to the value of the lower 16 bits 365 of the first word 325 of the new data 320, so the new data in the write request may be written to the memory block location. In an embodiment, the value of the first word may also be updated 220. For example, the value of the first word may be incremented, decremented and/or the like. For example, the value of the lower 16 bits of the first word may be incremented. In an embodiment, the lower 16 bits of the first word may represent the number of successful write operations associated with the memory block location. Referring to FIG. 3C, the value of the lower 16 bits 370 of the first word 340 may be incremented. In an embodiment, a value representing a successful write may be returned 225. Additional and/or alternate sized portions of a word may be compared and/or used within the scope of this disclosure.

In an embodiment, in response to the values not being equal, the new data may not be written 230 to the memory block location. For example, FIG. 4A illustrates an example of a comparison between a first word 405 of the data from an accessed memory block 400 whose value does not equal the value of a first word 415 of received new data 410. As illustrated by FIGS. 4A and 4B, the value of the lower 16 bits 420 of the first word 405 of from the accessed memory block 400 does not equal the value of the lower 16 bits 425 of the first word 415 of the received data 410. As such, the received data 410 may not be written to the memory block location 400.

In an embodiment, a value representing a write failure may be returned 235. In an embodiment, a counter representing the number of times the write attempt has been unsuccessful may be incremented 240. For example, the upper 16-bit field in the first word of the accessed memory may be used as a counter, and its value may be incremented upon execution of an unsuccessful write operation. For example, referring to FIG. 4C, the value of the upper 16-bit field 430 in the first word 405 may be incremented 435.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A device, comprising:
   a first processor that receives a write instruction that includes a first value, a second value, and write data; and
   a first memory unit that stores a third value, a fourth value, and memory data, wherein the first processor reads only the third value from the memory unit in response to receiving the write instruction, and wherein the first processor compares the first value with the third value, and in response to the first value being equal to the third value: (i) sets the third value equal to the second value, and (ii) overwrites the memory data with the write data, and in response to the first value not being equal to the third value the processor: (i) increments the fourth value, and (ii) does not overwrite the memory data.

2. The device of claim 1, wherein the write instruction is received from a second processor, and wherein no communication is sent to the second processor in response to the first value not equaling the third value.

3. The device of claim 1, wherein the fourth value is a count of failed write attempts.

4. The device of claim 1, wherein the fourth value is a sixteen bit wide value.

5. The device of claim 1, wherein the first processor receives the write instruction from a second memory unit, and wherein no communication is sent to the second memory unit in response to the first value not equaling the third value.

6. The device of claim 1, wherein the third value, the fourth value, and the memory data are stored in a contiguous memory block.

7. The device of claim 1, wherein the first value, the second value, the third value, and the fourth value are all sixteen bit wide values, and wherein the write data and the memory data are both thirty-two bits wide.

8. The device of claim 1, wherein in response to the first value not equaling the third value the first processor communicates the fourth value to a second processor that sent the write instruction.

9. A method, comprising:
   (a) receiving a write instruction, wherein the write instruction includes a first value, a second value, and write data;
   (b) reading a third value from a memory unit, wherein the reading of (b) occurs in response to the receiving of (a);
   (c) comparing the first value with the third value;
   (d) setting the third value equal to the second value;
   (e) overwriting memory data stored in the memory unit with the write data, wherein (d) and (e) are only performed only when the comparing of (c) indicates that the first value is equal to the third value; and
   (f) incrementing a fourth value stored in the memory unit; and
   (g) not overwriting the memory data, wherein (f) and (g) are performed only when the comparing of (c) indicates that the first value is not equal to the third value, and wherein the fourth value is a count of failed write attempts.

10. The method of claim 9,
wherein the fourth value is a count of successful write attempts.

11. The method of claim 9, wherein the write instruction is received by a first processor, and wherein the third value, a fourth value, and the memory data are read from a first memory unit.

12. The method of claim 9, wherein the write instruction is received by a first processor, wherein the third value, a fourth value, and the memory data are read from a first memory unit, and wherein the write instruction is received from a second memory unit.

13. The method of claim 9, wherein the third value, a fourth value, and the memory data are stored in a contiguous memory block.

14. The method of claim 9, further comprising:
(h) communicating the fourth value to a processor that sent the write instruction, wherein (h) is performed only when the comparing of (c) indicates that the first value is not equal to the third value.

15. The method of claim 9, wherein the first value and the third value are both sixteen bit wide values.

16. The method of claim 9, wherein the first value, the second value, the third value, and a fourth value are all sixteen bit wide values, and wherein the write data and the memory data are both thirty-two bits wide.

17. A device, comprising: a memory unit; and means for (a) receiving a write instruction including a first value, a second value, and write data, (b) reading only a third value from the memory unit, (c) comparing the first value with the third value, and (d) in response to the first value equaling the third value: (i) setting the third value equal to the second value, and (ii) overwriting memory data stored in the memory unit with the write data, wherein a first data set is ninety six bits wide, wherein the first value, the second value, the third value, and a fourth value are all sixteen bit wide values, wherein the write data and the memory data are both thirty-two bits wide, and wherein the fourth value is a count of failed write attempts.

* * * * *